United States Patent

[11] 3,600,011

[72] Inventor Robert L. Alvis
 Albuquerque, N. Mex.
[21] Appl. No. 859,469
[22] Filed Sept. 19, 1969
[45] Patented Aug. 17, 1971
[73] Assignee The United States of America as
 represented by the United States Atomic
 Energy Commission

[54] JOINT UTILIZING WEDGE-SHAPED
 RECTANGULAR LOCKING SHAFTS
 5 Claims, 5 Drawing Figs.
[52] U.S. Cl. ................................................. 285/305,
 285/421
[51] Int. Cl. ................................................. F16l 37/00
[50] Field of Search........................................... 285/305,
 421, 403; 287/53 T, 53 K

[56] References Cited
 UNITED STATES PATENTS
 565,698 8/1896 Sparks.............................. 285/421 X

| 1,692,798 | 11/1928 | Potter.............................. | 285/421 X |
| 3,181,897 | 5/1965 | Krayenbuhl et al............ | 285/305 X |

FOREIGN PATENTS 1,310,712 10/1962 France .......................... 285/305

*Primary Examiner*—Dave W. Arola
*Attorney*—Roland A. Anderson

ABSTRACT: A lightweight locking joint between two annularly or cylindrically shaped members in which at least one interfitting tongue and groove joint between the respective members is held in mating relationship by at least one set of two wedge-shaped rectangular shafts inserted into a common rectangular channel between the members through tangential access holes thereto, the common channel being formed by the telescopic juxtaposition of a partial channel in each member, each locking shaft wedging against the other of its set after sequential insertion of the shafts in oppositely disposed relationship in the channel filling the channel with the wedged shafts to insure a tight joint.

PATENTED AUG 17 1971 3,600,011
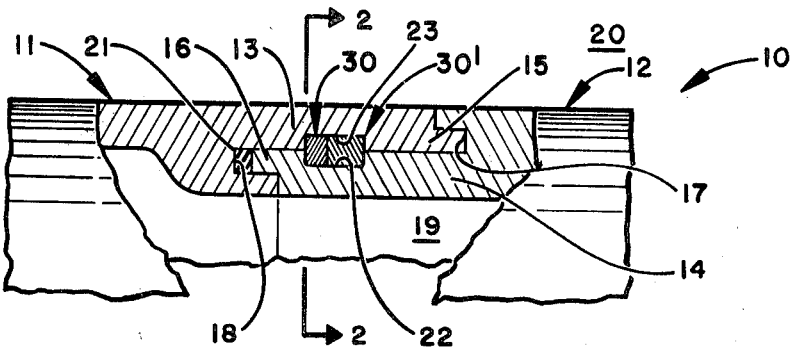
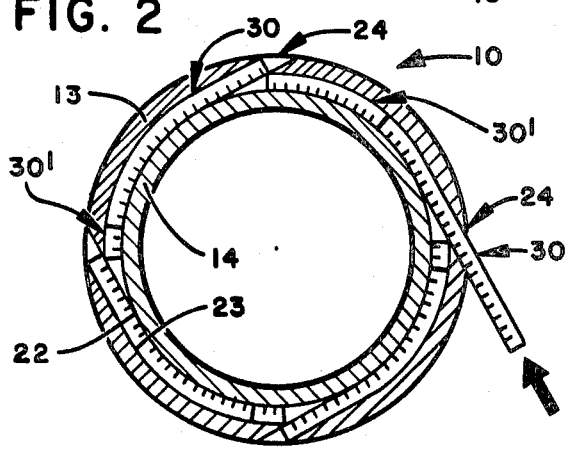
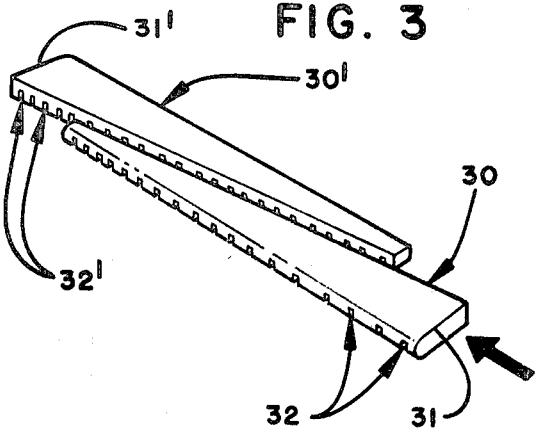
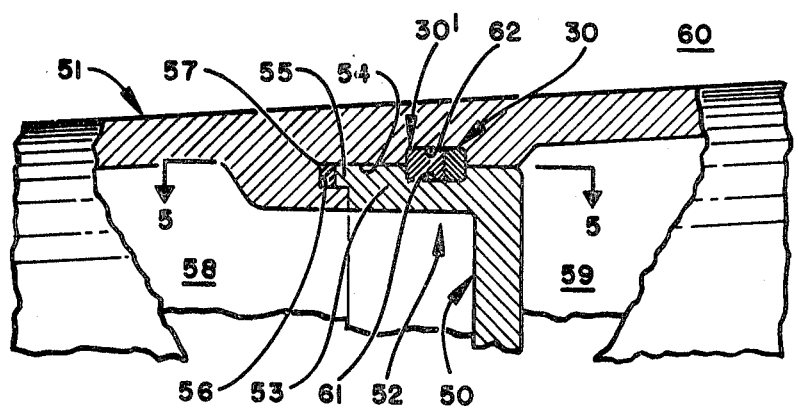
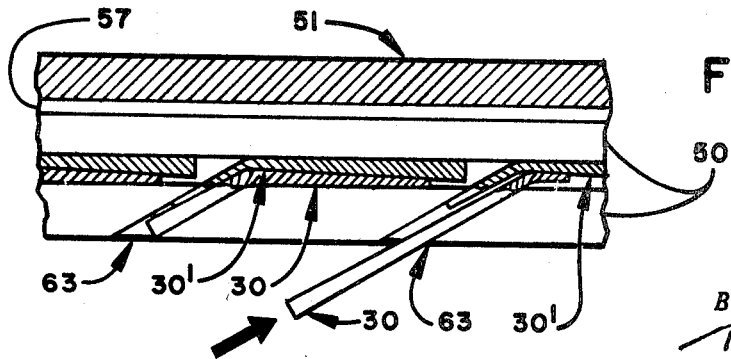
INVENTOR.
ROBERT L. ALVIS

JOINT UTILIZING WEDGE-SHAPED RECTANGULAR LOCKING SHAFTS

BACKGROUND OF INVENTION

Joining two members together often presents special problems when the joint must be lightweight and must be required to be fastened quickly, reliably and easily. Additional problems are presented if the joint is to be made between two hollow members such as hollow cylinders wherein no access is available to the inside of the members during the fastening, or, conversely where no access is available to the outside of the members, or where no access is available to some singular portions of the inside of the members where the joint is to be made.

One type joint which has been proposed for joining two hollow cylindrical segments forms the respective segment ends so that one has a portion which surrounds and telescopically receives the other. Annular grooves are cut in overlapping surfaces of the telescopically mounted segments which together form a common groove. A plurality of access holes are provided to the common groove, and a plurality of single locking elements are inserted through the access holes into the common groove. The locking elements are positioned within the common groove in such a manner that the cylindrical segments are locked together.

The use of a single locking element in this type joint has several disadvantages. Since the diameter of the common groove is the same all the way around, and the locking element is of the same width all along its length, in order to achieve a snug fit over the relatively long length of the locking element, considerable insertion force must be applied, often requiring the use of a pneumatic hammer. It is likewise difficult to remove a locking element once inserted from its locked position.

BRIEF DESCRIPTION OF THE DRAWING

The invention is illustrated in the accompanying drawing wherein:

FIG. 1 is a partially cut away plan view of a preferred embodiment of the joint of the invention;

FIG. 2 is a cross-sectional view of the embodiment illustrated in FIG. 1 taken along lines 2–2 in FIG. 1;

FIG. 3 is a perspective view of the wedge-shaped rectangular locking shafts used in the practice of the invention, illustrating their interrelationship;

FIG. 4 is a partially cutaway plan view of a second preferred embodiment of the joint of the invention; and FIG. 5 is a cross sectional view of the embodiment illustrated in FIG. 4 taken along lines 5–5 in FIG. 4.

In the drawing, the dimensions and shapes have been exaggerated for clarity and ease of description. Like reference numbers in the respective FIGS. of the drawing denote like parts.

BRIEF DESCRIPTION OF THE INVENTION

In light of the foregoing, it is, therefore, an object of the invention to provide a tight, lightweight joint which can be achieved quickly, reliably and easily, and into which can be incorporated a hermetic or other type seal.

This and other objects, features and advantages will be apparent to those skilled in the art from the following description, attached claims, and appended drawing.

The joint of the invention includes a first member having an end with a first groove cut in an inside face thereof. Extending through the end of the member to the first groove is a hole or a plurality of holes cut approximately tangentially to the groove. A second member having an end with a second groove cut in an outside face thereof is telescopically mated within the end of the first member with the first and second grooves juxtaposed to form a common channel between the first and second members. To lock the first and second members together at least one set of two shafts is used, each shaft being of substantially rectangular cross section and being formed along its length into a wedge with its widest end of width less than the width of but more than one-half of the width of the common channel. Each set of two shafts is inserted together into the common groove through the holes in the first member with the widest ends of the shafts of each set disposed in opposite directions. Thus, the combination of each set of shafts completely fills the common channel and are locked therein by the wedging action between them.

DETAILED DESCRIPTION OF THE PREFERRED EMBODIMENT

A preferred embodiment of the joint of the invention between member 11 and member 12 is denoted by the numeral 10 in FIGS. 1 and 2. Member 11 and member 12 may be of almost any shape, such as rectangular, oval, or round; members 11 and 12 are illustrated and described herein as cylinders since in practice cylindrical shaped members would be the most likely encountered.

End wall portions 13 and 14 of respective members 11 and 12 are formed to allow member 12 to be telescopically inserted within member 11, and, to aid in stability and security or tightness of the joint, wall portions 13 and 14 have tongues 15 and 16, respectively, formed thereon to fit into mating grooves 17 and 18, respectively, on end wall portion of the other member. The tongues and grooves are not essential to the invention, but may be desirable if the joint and members are subjected to stress environments.

To effect a seal between the inside 19 and outside 20 of the cylinders, a gasket 21 is provided within groove 18 upon which tongue 16 exerts pressure. Gasket 21 may be of any sealing material, such as neoprene, rubber, or the like.

As illustrated, a groove 22 is formed on the outside and completely around the wall portion 14 of member 12. A similar groove 23 is formed on the inside and completely around the wall portion 13 of member 11. With the members 11 and 12 in telescopically mating relationship, grooves 22 and 23 are juxtaposed to form a common channel, denoted hereinafter by the reference numerals 22–23, between the wall portions 13 and 14 of the members. Access to the common channel 22–23 is achieved by holes 24 (FIG. 2), the holes being formed through wall 13 substantially along a line tangential to the wall portion 14 of member 12.

To lock the members 11 and 12 together, a plurality of sets of two shafts, one set of which being illustrated in FIG. 3, are inserted into common channel 22–23. As illustrated in FIG. 3, each shaft 30 and 30' is identical to the other, having a rectangular cross section and a wedge cut extending along its length. Although the amount of taper of the wedge is not critical, the end 31 should be less than the width of the common channel 22–23, but should be just slightly greater than one-half the width of the common channel 22–23. Since the shafts 30 and 30' must assume an arcuate configuration within common channel 22–23 in the case of joining cylindrical members, slots or kerfings 32 and 32' may be cut on the underside of the shafts 30 and 30'. Additionally, to ease insertion and prevent binding of the shafts, the outside edges may be trimmed to eliminate any sharp, binding edges, or perhaps even formed into a semicircular shape, and, also, the shafts may be coated with a lubricating substance (not shown) such as graphite, silicone, or the like.

As illustrated particularly in FIG. 2, shaft 30' is first inserted into common channel 22–23 with the widest end of the wedge first. Subsequently, the second shaft 30 of the set is inserted, smallest end first, into common cavity 22–23 and wedged into position next to shaft 30'. Ideally, the lengths of shafts 30 and 30' and the degree of wedge thereof should be such that the shafts are allowed to extend from one hole 24 around to the next, yet remain partially within hole 24 for ease of removal. Thus, the reason for the requirement tat the widest end 31 be larger than one-half of the width of common channel 22–23 can be seen: in order to present substantially even pressure along the length of common channel 22-23, since the shafts 30 and 30' should ultimately be disposed substantially entirely side by side, the sum of the widths all along the shafts should just equal, and perhaps just exceed for a tight joint, the width of common channel 22-23. It can be seen, of course, that because the shafts are of a wedge shape, the joint can be made as tight as desired by merely applying an inserting pressure to shaft 30 to drive it outwardly from shaft 30' along its length. Also, because of the surface friction between the two shafts all along the juxtaposed wedge faces, the shafts are not easily removable without exerting a removal force directly upon them, and a failure of the joint can occur only if the shafts are sheared all along their lengths.

A second preferred embodiment of the invention is illustrated in FIGS. 4 and 5. In the illustrated embodiment a first member 50 is joined to the inside of a second member 51 by the joint of the invention 52, as may be encountered, for example, in partitioning a cylindrical (or other shaped) member. To achieve the joint, a wall portion 53 is formed on member 50, and a mating surface 54 is formed on the inside wall of member 51. Again, if desired for stability, a tongue and groove, such as tongue 55 on wall portion 53 and groove 56 on mating surface 54, may be utilized. A sealing gasket 57 may also be disposed within groove 56 to seal area 58 from area 59 on the other side of partitioning member 50 and area 60 outside member 51.

A groove 61 is cut in and around the outside of wall portion 53 of member 50, and a corresponding groove 62 is cut in and around mating surface 54 of member 51 to form a common channel 61-62.

Although access holes to common channel 61-62 may be cut through the mating surface 54, from area 60, similar to those described in the preferred embodiment illustrated in FIGS. 1 and 2, the access holes may also be cut through both mating surface 54 and wall portion 53, from area 59, as illustrated particularly in FIG. 5. Thus, the locking shafts 30 and 30' will necessarily be inserted through holes 63 one on top of the other rather than side by side, as above described with reference to FIGS. 1 and 2. The same criterion for the locking sets apply to the length, widths, and degree of wedge, as above described with respect to FIGS. 1 and 2.

Although the invention has been described and illustrated with a certain degree of particularlity, it is understood that the present disclosure is made by way of example only and that various changes, modifications, and arrangements will occur to one skilled in the art without departing from the spirit and scope of the invention.

What I claim is:

1. A joint structure comprising, a first tubular member having a wall with a first groove cut in an inside face thereof and at least one hole extending through said wall and communicating with said groove, a second tubular member having a wall with a second groove cut in an outside face thereof, the wall of said second member being telescopically mated within the wall of said first member with said first and second grooves juxtaposed to form a common annular channel of generally uniform width and height between said members, at least one set of two elongated flexible shafts, each shaft being of wedge shape along its length, the width of each shaft at the widest point of said wedge being less than the width of said common channel but more than one-half of the width of said common channel for ready movement of a shaft through the channel, said set of two shafts being insertable into said common groove through the at least one hole in said first member by sliding a first shaft wide end first into said groove followed by a second shaft oppositely disposed with respect to the first shaft, the widest end of said first shaft being disposed remote from said one hole and the widest end of said second shaft being disposed adjacent said one hole and within the outer circumference of said first tubular member and the combination of said set of shafts completely filling the common channel width only when said second shaft wedges against said first shaft as the combined shaft widths reach said groove width and locked in said common channel by said wedging action and frictional forces between the wedged juxtaposed length of said shafts to lock said first and second members together.

2. The joint of claim 1 wherein said at least one hole extends from an outside face of said first member through said wall into said common groove.

3. The joint of claim 1 wherein said at least one hole extends through an interior wall portion of said first tubular member adjoining and communicating with at least one hole of said second member to form a common access hole between said first and second members to said common groove.

4. The joint of claim 1 further comprising at least one mateable tongue and groove on the respective walls of said first and second members.

5. The joint of claim 4 further comprising a sealing member disposed within the groove of said tongue and groove.